(12) United States Patent
Bretzigheimer et al.

(10) Patent No.: US 9,840,242 B2
(45) Date of Patent: Dec. 12, 2017

(54) METHOD FOR REGULATING DRIVING STABILITY

(71) Applicant: Continental Teves AG & Co. oHG, Frankfurt (DE)

(72) Inventors: Kai Bretzigheimer, Mainz (DE); Frank Seurer, Bad Vilbel (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/101,504

(22) PCT Filed: Aug. 11, 2014

(86) PCT No.: PCT/EP2014/067152
§ 371 (c)(1),
(2) Date: Jun. 3, 2016

(87) PCT Pub. No.: WO2015/086167
PCT Pub. Date: Jun. 18, 2015

(65) Prior Publication Data
US 2016/0311416 A1  Oct. 27, 2016

(30) Foreign Application Priority Data

Dec. 13, 2013  (DE) .......................... 10 2013 225 970

(51) Int. Cl.
*B60T 8/1755* (2006.01)
*B60T 8/24* (2006.01)

(52) U.S. Cl.
CPC .......... *B60T 8/17558* (2013.01); *B60T 8/246* (2013.01); *B60T 2201/022* (2013.01);
(Continued)

(58) Field of Classification Search
CPC .. B60T 8/17558; B60T 8/246; B60T 2270/30; B60T 2250/03; B60T 2201/022; B60T 2220/03
See application file for complete search history.

(56) References Cited

U.S. PATENT DOCUMENTS 6,273,529 B1  8/2001  Woywod
9,014,921 B2  4/2015  Bretzigheimer
(Continued)

FOREIGN PATENT DOCUMENTS

DE   19820107   6/1999
DE   10222231   12/2003
(Continued)

OTHER PUBLICATIONS

German Search Report for German Application No. 10 2013 225 970.0 dated Feb. 3, 2016, including partial translation.
(Continued)

*Primary Examiner* — Anne M Antonucci
(74) *Attorney, Agent, or Firm* — RatnerPrestia

(57) ABSTRACT

A method in which the driving behavior of a vehicle is influenced depending on surroundings data in order to support an evasive maneuver as soon as a risk of collision is detected using the data from surroundings sensors and vehicle sensors. The vehicle has an electronically regulated braking system which allows a driver-independent build-up and a modulation of the braking forces on the individual wheels of the vehicle, and a steering input by the drive is supported in the event of a detected risk of collision by a driver-independent braking intervention. A brake slip of at least one wheel of the vehicle is limited to a first slip threshold in a first phase of the evasive maneuver and to a second slip threshold in a second phase of the evasive maneuver, wherein the first slip threshold is smaller than the
(Continued)

second slip threshold. The invention further relates to an electronic controller.

13 Claims, 2 Drawing Sheets

(52) U.S. Cl.
CPC ....... *B60T 2220/03* (2013.01); *B60T 2250/03* (2013.01); *B60T 2270/30* (2013.01)

(56) References Cited

U.S. PATENT DOCUMENTS

| | | | |
|---|---|---|---|
| 9,108,600 B2 | 8/2015 | Hartmann | |
| 2012/0323477 A1* | 12/2012 | Flehmig | B60W 30/09 701/301 |

FOREIGN PATENT DOCUMENTS

| | | |
|---|---|---|
| DE | 102006042666 | 3/2008 |
| DE | 102008005305 | 7/2009 |
| DE | 102010028384 | 11/2010 |
| DE | 102011080789 | 2/2012 |

OTHER PUBLICATIONS

International Search Report and Written Opinion of the International Searching Authority for International Application No. PCT/EP2014/067152 dated Oct. 22, 2014.

\* cited by examiner

METHOD FOR REGULATING DRIVING STABILITY

CROSS REFERENCE TO RELATED APPLICATIONS

This application is the U.S. National Phase Application of PCT International Application No. PCT/EP2014/067152, filed Aug. 11, 2014, which claims priority to German Patent Application No. 10 2013 225 970.0, filed Dec. 13, 2013, the contents of such applications being incorporated by reference herein.

FIELD OF THE INVENTION

The invention relates to a method and to an electronic control device for regulating driving stability.

BACKGROUND OF THE INVENTION

In addition to electronically controlled brake systems which make available functions such as a traction controller (ABS) which prevents the wheels from locking during full braking, and a vehicle movement dynamics controller (ESC) which acts in a stabilizing fashion on the motor vehicle during dynamic driving maneuvers by means of targeted braking interventions, motor vehicles increasingly have an ambient sensor system with which other road users and non-movable obstacles can be detected and the positions or speeds thereof with respect to the driver's own vehicle can be determined.

The networking of the ambient sensor system with an electronically controlled brake system permits adaptive cruise control (ACC) with respect to the motor vehicle traveling ahead, a warning to be made to the driver when particularly critical situations occur, and automatic initiation of emergency braking if there is a risk of collision. In order to avoid incorrect interventions, such an emergency braking assistant (EBA) must intervene only at a late time, i.e. at the shortest possible distance from the obstacle, as a result of which, despite this driver assistance, in many situations a collision with the obstacle or with the other road user can only be attenuated, and not avoided, solely by braking.

There are various reasons for this:
- Maintaining an ideal distance from the vehicle traveling ahead is not practicable in dense traffic.
- A considerably slower vehicle cuts in from an adjacent lane.
- An oncoming vehicle is overlooked at the start of an overtaking maneuver.
- The distance calculation of the driver assistance system assumes the coefficient of friction of a level and dry roadway, as a result of which the braking distance on a slippery roadway is longer than the interval to the engagement time.

In order to prevent a collision, many drivers decide on an unbraked or braked avoidance maneuver. The intuitive steering input can be too dynamic for normal drivers who only experience emergency avoidance situations rarely, and said steering input can give rise to violent vehicle reactions, in particular during the subsequent steering back process.

The genus-forming DE 10 2011 080 789 A1, which is incorporated by reference discloses a method in which the driving behavior of the vehicle is influenced as a function of surroundings data in order to assist an avoidance maneuver as soon as a risk of collision is detected using the data from one or more ambient sensors, in particular radar sensors and/or cameras, and the data from one or more vehicle sensors, in particular steering angle sensor and/or yaw rate sensor and/or wheel rotational speed sensors, wherein the vehicle has an electronically controlled brake system which permits a build up and modulation of the braking forces at the individual wheels of the vehicle independently of the driver. When a risk of collision is detected, in a first phase turning in of the driver is assisted and/or in a second phase steering of the driver is damped.

SUMMARY OF THE INVENTION

An aspect of the present invention aims to improve further the assistance provided to the driver during an avoidance process with respect to controllability by the driver and driving stability.

A method is made available in which the driving behavior of a vehicle is influenced by means of an electronically controlled brake system as a function of surroundings data in order to assist an avoidance maneuver as soon as a risk of collision is detected using the data from ambient sensors and vehicle sensors, wherein when a risk of collision is detected turning in of the driver is assisted by means of a braking intervention which is independent of the driver, that is to say a build up and/or modulation of the braking forces at the individual wheels. According to the invention in a first phase of the avoidance maneuver a brake slip at at least one wheel of the vehicle is limited to a first slip threshold value, and in a second phase of the avoidance maneuver it is limited to a second slip threshold value, wherein the first slip threshold value is lower than the second slip threshold value.

An aspect of the invention is based on the concept that modern vehicles often have a vehicle movement dynamics controller (ESC) which can generate an additional yawing moment, for example, by building up braking force at an intervention wheel independently of the driver, in order to adapt the measured actual behavior of the vehicle to the set point behavior which is determined on the basis of at least the set steering angle. In principle, traction control, during which the wheel speeds of the individual wheels are measured and compared with a reference speed, takes place independently of, or subordinately to, the vehicle movement dynamics control. If the slip or the difference between the wheel speed and the reference speed of a wheel rises above a predefined threshold value, the braking force at this wheel is reduced. According to the prior art, in a traction control process the threshold value is selected in such a way that the shortest possible braking distance results.

By traction control taking place on the basis of a first slip threshold value, which preferably lies in the range of 10%-20%, when a risk of collision which requires avoidance is detected, a reduction in the lateral forces which can be transmitted by the tire can be avoided. Therefore, in a first phase, the vehicle also follows the prescription of the driver directly and in an undamped way even in wet or snowy conditions when steering into the avoidance path.

As a result of the fact that in a second phase the traction control process takes place on the basis of a second slip threshold value which preferably lies in the range of 30%-50%, in this phase of the avoidance maneuver the lateral forces which can be transmitted are limited. This avoids "veering off" of the vehicle during which the yawing for the purpose of cutting out changes excessively quickly to yawing into the avoidance path, wherein high yawing accelerations occur. This could otherwise lead to oversteering and lateral positioning or even to tipping over of the vehicle. A further advantage is that a vehicle which has a tendency to understeer owing to the reduced lateral forces requires less space when cutting back into the avoidance lane than an oversteering vehicle, or a relatively narrow avoidance path is sufficient.

The first phase of the avoidance maneuver expediently starts when a risk of collision is detected, wherein the first phase does not start, in particular, until after turning in of the driver is detected. The customary anti-lock brake control or traction control can therefore be maintained for as long as possible with optimized transmission of longitudinal forces, at the cost of the lateral forces, in the sense of wide ranging braking of the vehicle.

It is advantageous if the second phase starts as soon as the driver steers counter to the avoidance direction, wherein the second phase preferably does not start until a measured steering angle speed and/or a measured yaw acceleration exceeds a predefined skidding threshold value. If the driver steers back and a lateral offset which is sufficient to avoid the obstacle has therefore been achieved, it is expedient to limit the lateral forces which can be transmitted, in particular at the front axle by applying a high brake step. In addition to shortening the braking distance to the stationary state, this prevents a build up of excessive lateral forces which endanger the driving stability and could lead to the vehicle rolling over. There can also be provision for this reduction in lateral force to be performed when, or only if, a rapid steering movement poses a particularly high risk to the driving stability. If the driver steers in a controlled fashion, the vehicle continues to follow his prescriptions directly and in an undamped fashion.

In the first phase a build up of braking force is preferably carried out at one or more wheels of the vehicle on the inside of the bend independently of the driver, in order to generate a yawing moment in the avoidance direction, wherein at least the brake slip at the intervention wheel or intervention wheels is limited. As a result of the fact that steering by the driver is assisted without a reduction in lateral forces, a lateral offset which is sufficient for the avoidance can be very quickly achieved.

In the second phase a build up of braking force is preferably carried out at one or more wheels of the vehicle on the outside of the bend independently of the driver, in order to limit the yaw acceleration, wherein at least the brake slip at the intervention wheel or intervention wheels is limited. If the driver makes a violent steering movement during the steering back process, there can appropriately be provision to limit the built-up yawing acceleration by means of active braking interventions.

It is expedient if a build up and/or reduction of the braking force is carried out in accordance with a set point yaw rate independently of the driver, which set point yaw rate is determined, in particular, on the basis of a calculated avoidance trajectory. Since an optimum avoidance trajectory is calculated in this variant, the yaw rate can be adjusted about the set point yaw rate which is predefined by the avoidance trajectory. In many cases, the necessary lateral offset can be carried out without endangering the driving stability as a result of high lateral forces which occur.

The second slip threshold value is advantageously defined in accordance with a measured yaw acceleration and/or a measured steering angle speed. If a frantic steering movement of the driver is detected, this can be damped to a great extent by a control threshold of the brake slip and a corresponding reduction in lateral force.

According to one preferred embodiment of the invention, when it is detected that the vehicle is approaching an obstacle, at first a braking intervention which is independent of the driver is carried out at all the wheels of the vehicle in order to reduce the velocity, wherein, in particular, a risk of collision is not detected until a collision can no longer be prevented solely by braking. As long as deceleration of the vehicle could be sufficient to prevent a collision without leaving the lane, in this embodiment braking intervention takes place independently of the driver as in the case of a pure emergency braking assistant.

According to one particularly preferred embodiment of the invention, when it is detected that the vehicle is approaching an obstacle, the brake slip at all the wheels of the vehicle is limited to a third slip threshold value which is higher than or equal to the second slip threshold value. If the collision can in principle be prevented or at least attenuated by braking the vehicle to the stationary state, the maximum longitudinal deceleration is ensured up to detected turning in of the driver.

An aspect of the invention also relates to an electronic control device, in particular electronic brake control device, which receives information from one or more ambient sensors, in particular radar sensors and/or cameras, and is connected to one of more vehicle sensors, in particular steering angle sensor and/or yaw rate sensor and/or wheel rotational speed sensors, and which can bring about a build up and modulation of the braking forces at the individual wheels of the vehicle independently of the driver by activating actuators. According to the invention a method as claimed in at least one of the preceding claims is carried out by the control device.

BRIEF DESCRIPTION OF THE DRAWINGS

Further preferred embodiments can be found in the dependent claims and the following description of an exemplary embodiment with reference to figures, of which:

DETAILED DESCRIPTION OF THE PREFERRED EMBODIMENTS

Figure 1:
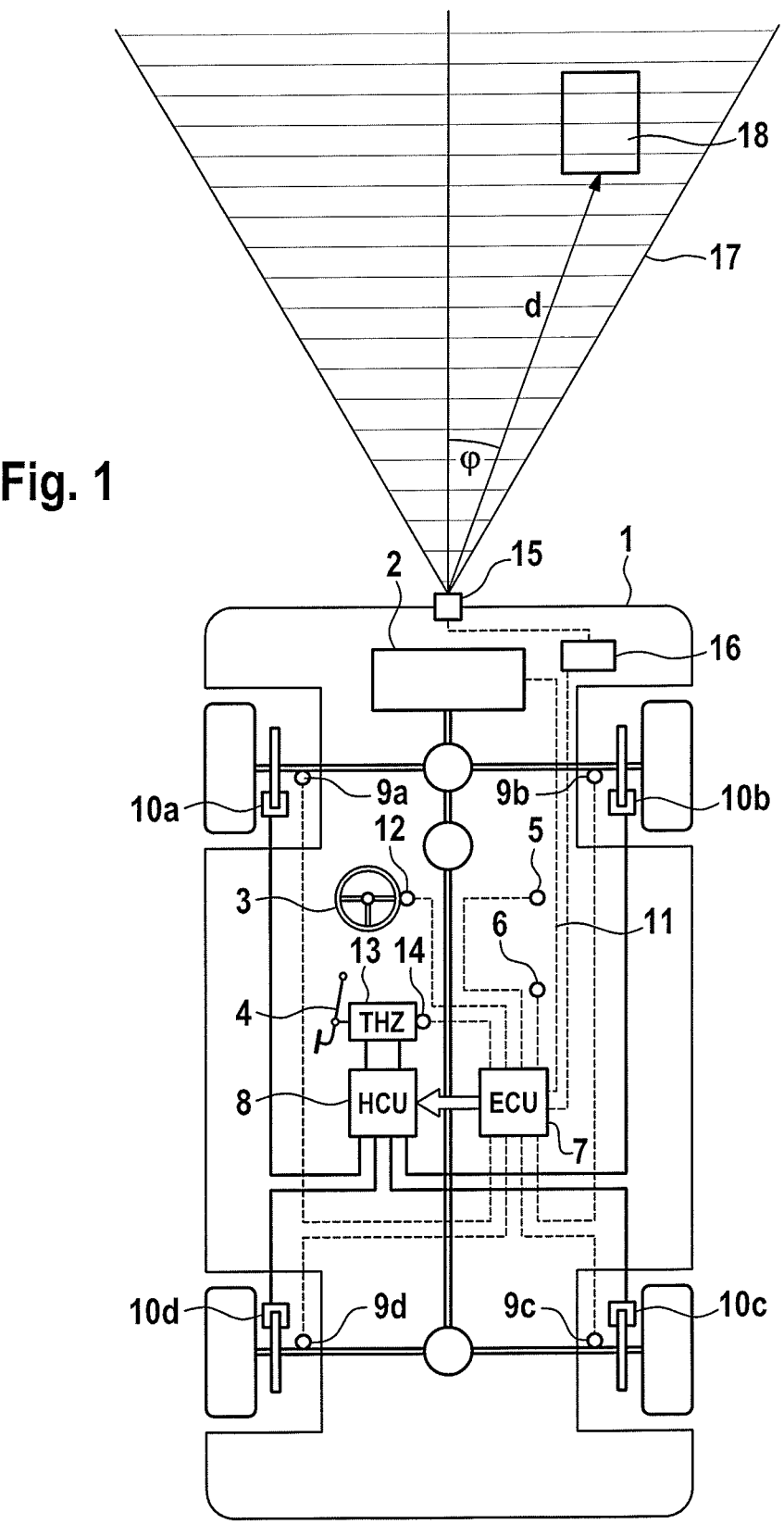
FIG. 1 shows a motor vehicle which is suitable for carrying out the method.

FIG. 1 shows a schematic illustration of a motor vehicle 1 which is suitable for carrying out the method according to an aspect of the invention. Said motor vehicle 1 has a drive engine 2 which drives at least some of the wheels of the vehicle, a steering wheel 3, a brake pedal 4, which is connected to a tandem master cylinder (THZ), 13, and four wheel brakes 10a-10d which can be activated individually. The method according to an aspect of the invention can be carried out even if only some of the vehicle wheels are driven. In addition to or as an alternative to hydraulic friction brakes it is also possible to use friction brakes which can be actuated electro mechanically on one, several or all of the wheels as wheel brakes. According to one alternative embodiment of the invention, the vehicle has an electric drive, and the braking torque at at least one wheel is generated at least partially by the electric machine or machines operated as a generator.

For the sensing of vehicle movement dynamic states, a steering wheel sensor 12 is provided for measuring the steering angle $\delta$, four wheel rotational speed sensors 9a-9d are provided for measuring the rotational speeds $V_i$ of the individual wheels, a lateral acceleration sensor 5 is provided for measuring the lateral acceleration $a_{lat}$, a yaw rate sensor 6 is provided for measuring the yaw angle rate $\Psi$ which is also denoted as the yaw rate, and at least one pressure sensor 14 is provided for measuring the brake pressure ρ generated by the brake pedal and THZ and/or an actuation travel sensor. The signals of the wheel sensors are fed to an electronic control unit (ECU) 7 which determines the vehicle speed $V_{Ref}$ from the wheel rotational speeds $V_i$ on the basis of predefined criteria.

The ECU (the electronic control unit) 7 receives the data of the sensors which are described above and of other sensors which can be made possibly present and controls the hydraulic unit (HCU) 8 in order to permit a build up or modulation of the brake pressure in the individual wheel brakes independently of the driver. In addition, the driving torque which is generated at a particular time by the drive engine 2 and the torque which is desired by the driver are determined. This may involve variables which are determined indirectly and which are derived, for example, from an engine characteristic diagram and transmitted to the ECU 7 via an interface 11, for example a CAN or FLexRay bus from the engine control unit (not shown).

The ECU 7 carries out one or more methods for controlling the vehicle movement dynamics, wherein arbitration takes place, if appropriate, between simultaneously occurring braking requests. Therefore, the yaw rate control process which compares the measured yaw rate with a model yaw rate frequently takes place. If this difference is above the control entry threshold, the braking intervention starts. The model yaw rate corresponds to the set point yaw rate and is formed by a simple vehicle model relating to the steering angle and the vehicle speed. In addition, the slip angle speed is frequently controlled. This variable is also formed by means of the vehicle model and corresponds in oversteering situations to the speed with which the vehicle turns in or the rear of the vehicle veers out. As soon as a certain threshold for the slip angle speed is exceeded, the braking intervention starts. In parallel with this or subordinate to or independently of the vehicle movement dynamics control operations, a traction control operation takes place which prevents the wheels from locking during a braking process.

Furthermore, the vehicle 1 has an ambient sensor system with at least one ambient sensor 15 with which objects in the environment of the vehicle can be detected, which objects are, in particular, further motor vehicles which move in the same or in an adjacent lane to the side of and/or in front of the vehicle 1. However, stationary or virtually stationary objects such as, for example, trees, pedestrians or roadway boundaries are also possible objects. For example, an ambient sensor 15 with a sensing range 17 is shown which comprises a spatial angle in front of the vehicle 1 in which an object 18 is illustrated. The signals of the ambient sensor 15 are evaluated by a control computer 16 and corresponding information is made available to the ECU 7. In principle, control computers 16 can, however, also be integrated in the ambient sensor 15, and/or the ECU 7 can directly process the sensor signals.

The ambient sensor 15 is, for example, a LIDAR (Light Detection and Ranging) sensor which is known per se and which measures the distances d to the sensed points of an object and also the angles φ between the straight lines connecting to these points and the central longitudinal axis of the vehicle, as is illustrated by way of example for a point of the object 18 in FIG. 1. The fronts of the sensed objects which face the vehicle 1 are composed of a plurality of sensed points to which the sensor signals are transmitted, the correlations between points and the shape of an object are produced, and a reference point is determined for the object 18. In this context, for example the center point of the object 18 or the center point of the sensed points of the object can be selected as the reference point. If the speeds of the detected points and therefore the speed of the sensed objects cannot be measured directly, they are preferably calculated from the difference between the distances measured in successive time increments. In a similar way, the acceleration of the objects can basically also be determined by deriving their positions twice. The speed of the objects can also be determined, for example, by means of the Doppler effect, in particular if the ambient sensor is a radar sensor. In principle, one or more cameras or other ambient sensors can also be used.

As explained in the introduction, sometimes a collision with an obstacle cannot be avoided by full braking, even with optimum utilization of the frictional engagement. In such situations, only an avoidance maneuver, such as a single or double change of lane, prevents the collision. Generally, the driver can prefer an avoidance maneuver over pure braking, depending on the specific driving situation.

Figure 2:
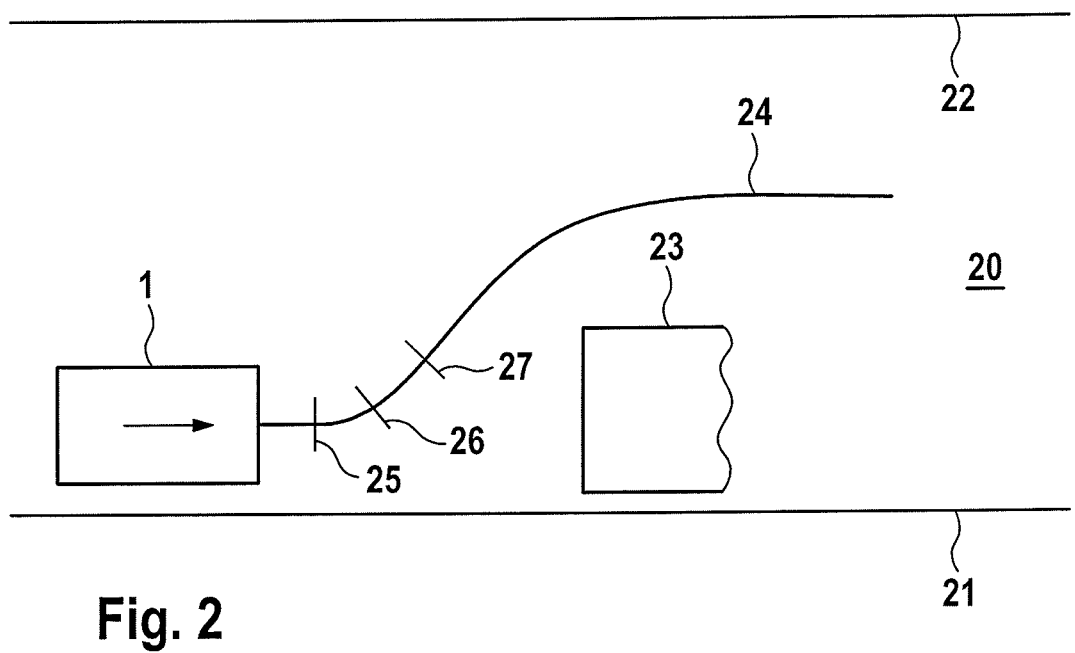
FIG. 2 shows a schematic illustration of an avoidance process.

In FIG. 2, a schematic illustration of an avoidance process is shown. The vehicle 1 is traveling on a road 20 with a right-hand roadway edge 21 and a left-hand roadway edge 22 towards an obstacle 23, for example a stopped car. A corresponding situation may also have been caused, in particular, by a change of lane of a relatively slow vehicle traveling ahead. In order to avoid the collision, the driver carries out, for example, a single change of lane, wherein the vehicle follows the trajectory 24.

In this context, the driver starts at the point 25 with a steering movement which is assisted by building up an additional yawing moment in the avoidance direction (that is to say the steering angle which is adopted by the driver) by corresponding braking interventions. In the case of full braking, the longitudinal force at the front wheel on the outside of the bend is expediently reduced by a wheel-specific reduction of braking pressure at the instant at which the driver turns in, so that the resulting yawing moment assists the steering prescription of the driver, and the vehicle follows said steering prescription more directly. In the case of partially braked travel, a pressure build up can advantageously take place at a wheel on the inside of the bend.

By virtue of the fact that in this phase a relatively low slip threshold value of the traction controller is set, the avoidance movement can be assisted without undesired reduction of lateral force. Therefore, as soon as it has been detected that the collision can no longer be avoided by full braking and/or the avoidance would be possible by means of the short distance only with very high steering dynamics, in the traction controller, the steerability is prioritized over the shortest possible braking distance. A particularly early detection and corresponding reaction reduces the duration of the slip processes at the wheels, as a result of which a build up of lateral forces during steering is always ensured.

If it is detected on the basis of the integrated yaw rate and the required lateral offset or on the basis of a determined avoidance trajectory that a suitable avoidance course has been achieved, it is advantageous to damp the steering of the vehicle already at point 26, in particular in that corresponding braking interventions generate an additional yawing moment counter to the avoidance direction.

As soon as turning in of the driver is detected, which is the case, for example, at point 27, a high slip threshold value of the traction controller is set. This prevents excessive steering putting the driving stability in danger and causing the vehicle to roll over. Furthermore, the space required in the lateral direction for the avoidance maneuver is reduced compared to that of an oversteering vehicle.

The invention claimed is:

1. A method in which the driving behavior of a vehicle is influenced as a function of surroundings data in order to assist an avoidance maneuver as soon as a risk of collision is detected, the method comprising:
 receiving, by a processor of an electronically controlled brake system, data detected from one or more ambient sensors and data detected from one or more vehicle sensors,
 when a risk of collision is determined by the processor of the electronically controlled brake system, the avoidance maneuver of the driver is assisted by a build up and modulation of braking forces applied to the individual wheels of the vehicle independent of the driver, by:
  limiting, by the processor, in a first phase of the avoidance maneuver, a brake slip of at least one wheel of the vehicle by setting a first slip threshold value for triggering the braking forces applied to the individual wheels of the vehicle, and
  limiting, by the processor, in a second phase of the avoidance maneuver that occurs after the first phase, the brake slip by setting a second slip threshold value for triggering the braking forces applied to the individual wheels of the vehicle,
  wherein the first slip threshold value is lower than the second slip threshold value.

2. The method as claimed in claim 1, wherein the first phase of the avoidance maneuver starts when a risk of collision is detected, wherein the first phase does not start until after turning in of the driver is detected.

3. The method as claimed in claim 2, wherein the second phase starts when the driver steers counter to the avoidance direction, wherein the second phase does not start until a measured steering angle speed and/or a measured yaw acceleration exceeds a predefined skidding threshold value.

4. The method as claimed in claim 1, wherein the second phase starts when the driver steers counter to the avoidance direction, wherein the second phase does not start until a measured steering angle speed and/or a measured yaw acceleration exceeds a predefined skidding threshold value.

5. The method as claimed in claim 1, wherein in the first phase a build up of braking force which is independent of the driver takes place at one or more wheels of the vehicle on the inside of the bend, in order to generate a yawing moment in the avoidance direction, wherein at least the brake slip at the intervention wheel or intervention wheels is limited.

6. The method as claimed in claim 1, wherein in the second phase a build up of braking force is carried out at one or more wheels of the vehicle on the outside of the bend independently of the driver, in order to limit the yaw acceleration, wherein at least the brake slip at the intervention wheel or intervention wheels is limited.

7. The method as claimed in claim 1, wherein a build up and/or reduction of braking force is carried out in accordance with a set point yaw rate independently of the driver, which set point yaw rate is determined on the basis of a calculated avoidance trajectory.

8. The method as claimed in claim 1, wherein the second slip threshold value is defined in accordance with a measured yaw acceleration and/or a measured steering angle speed.

9. The method as claimed in claim 1, wherein when it is detected that the vehicle is approaching an obstacle, at first a braking intervention which is independent of the driver is carried out at all the wheels of the vehicle in order to reduce the velocity, and wherein a risk of collision is not detected until a collision can no longer be prevented solely by braking.

10. The method as claimed in claim 9, wherein when it is detected that the vehicle is approaching an obstacle, the brake slip at at least the wheels of the front axle is limited to a third slip threshold value which is higher than or equal to the second slip threshold value.

11. The method as claimed in claim 9, when it is detected that the vehicle is approaching an obstacle, the brake slip at all the wheels of the vehicle is limited to a third slip threshold value which is higher than or equal to the second slip threshold value.

12. The method as claimed in claim 1, wherein the one or more ambient sensors are selected from the group consisting of radar sensors and cameras, and the one or more vehicle sensors are selected from the group consisting of a steering angle sensor, a yaw rate sensor and wheel rotational speed sensors.

13. The method as claimed in claim 1, wherein the one or more ambient sensors are selected from the group consisting of radar sensors and cameras, and the one or more vehicle sensors are selected from the group consisting of a steering angle sensor, a yaw rate sensor and wheel rotational speed sensors.

* * * * *